Figure 1:
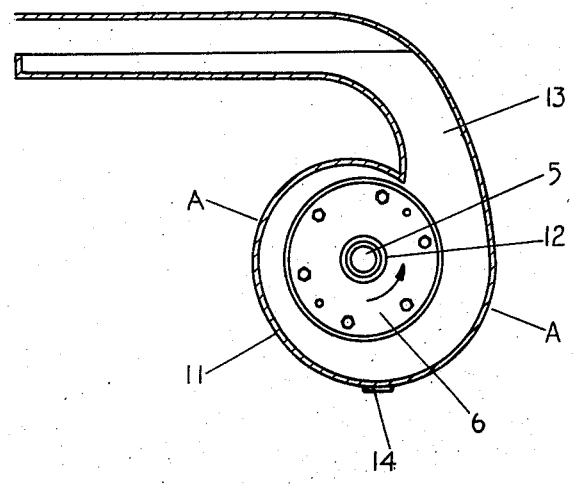

Sept. 9, 1958  P. J. EVANS ET AL  2,850,764
PROCESS AND APPARATUS FOR CONNECTING THERMOPLASTIC
MATERIAL TO GRANULAR FORM
Filed Aug. 27, 1954

INVENTORS
PETER JOHN EVANS
JOHN WILLIAM FREDERICK FARR
WILLIAM SURMAN GILMOUR
ALEXANDER KENNAWAY
BY Cushman, Darby & Cushman
ATTORNEYS

United States Patent Office 2,850,764
Patented Sept. 9, 1958

2,850,764
PROCESS AND APPARATUS FOR CONVERTING THERMOPLASTIC MATERIAL TO GRANULAR FORM

Peter John Evans, Welwyn Garden City, John William Frederick Farr, Luton, William Surman Gilmour, Welwyn, and Alexander Kennaway, London, England, assignors to Imperial Chemical Industries Limited, Millbank, London, England, a corporation of Great Britain Application August 27, 1954, Serial No. 452,636

Claims priority, application Great Britain March 19, 1954

13 Claims. (Cl. 18—1)

This invention relates to improvements in the conversion of thermoplastic polymeric materials to a granular form.

In copending application Serial No. 452,635 is described a process for converting thermoplastic polymeric materials into a granular form particularly suitable for extrusion or for injection or compression moulding, which comprises extruding the material in the molten state in the form of a thread or rod, preferably having a cross-section of circular, elliptical or like rounded shape, directly from the extrusion orifice into a body of cooling liquid, and cutting the thread or rod transversely into fragments while it is immersed in the liquid and before it has cooled throughout to the solid state.

By this process granules are produced which have convex, substantially spherical surfaces, tending in some cases towards the form of a hemisphere, at their cut ends. The granules may thus vary in shape, ranging from curved-faced discs through substantially spherical shapes to elongated pellets of round-ended cylindrical shape, according to the frequency of cutting, the rate and temperature of extrusion and the diameter of the extruded threads or rods. A particularly free-flowing granular material is formed when the granules are of substantially spherical shape.

It is stated in copending application Serial No. 452,635 that the granules so produced may be removed from the cutter by currents of the cooling liquid; but we have found, when the cutter is operating at high speeds, that there is some difficulty in removing the granules from the region of the cutter, because of turbulence produced by the cutter in the cooling liquid.

We have now found that in the process of copending application Serial No. 452,635 the granules of thermoplastic polymeric material are particularly easily removed when the cutter used is a rotating cutter, the cooling liquid is supplied to the region of the axis of the cutter, and means are provided to conduct away the liquid and entrained granules of polymeric material driven outwards by rotation of the cutter. The cooling liquid with entrained granules may then be passed to a screen or other means for separating the granules from the liquid, by way of a trough or duct which is long enough to allow adequate cooling of the granules. If the pumping action of the rotating cutter is not sufficient for conveying the liquid with the entrained granules, the liquid may be conveyed to the cutter under pressure to obtain this effect.

One particular advantage of the present invention is that it provides a method by which granules even of those thermoplastic materials that are heavier than water, or other cooling liquids normally used, can readily be removed from the liquid after they have been formed. In the absence of any control of the currents resulting from the rotation of the cutter, these heavier granules tend to remain dispersed in the cooling liquid, and may even stick to the freshly extruded material.

It is preferred that the extruded thread or rod be cut transversely immediately against the extrusion orifice, and that a plurality of threads or rods be extruded simultaneously through a die having a plurality of rounded orifices.

Because the extrusion orifices communicate directly with the cooling liquid, it is necessary to ensure that the liquid does not chill the extruder and the thermoplastic material before extrusion enough to prevent the material from being extruded at an economic rate. When the rate of extrusion is particularly high and the material is extruded at a temperature well above its softening temperature it may not be necessary to take any steps to prevent the liquid from chilling the extruder. Usually, however, it is desirable to insulate the extruder from the liquid; this may be done by facing the extruder with a layer of an insulating material, through which the orifices pass, but it is preferable to provide a metal plate, with suitable orifices, to cover the face of the extruder, and to insulate this from the extruder by means of a gasket of insulating material. The latter method provides a hard working surface against which the knives operate. Suitable insulating materials include asbestos and polytetrafluoroethylene.

Figure 2:
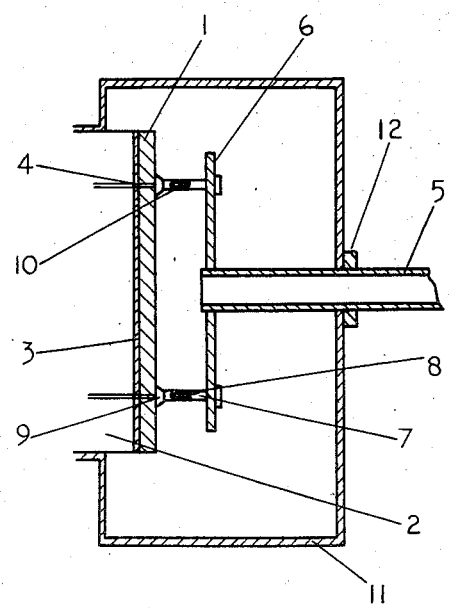

One particular form of apparatus for operating the process of this invention is shown diagrammatically in the accompanying drawings, in which:

Figure 1 is an end view of the apparatus; and
Figure 2 is a sectional diagram through A—A of Figure 1.

In these figures, 1 is a wear plate which is screwed to the face of an extrusion die 2 through one wall of a volute casing 11, which contains the cooling liquid, and through an asbestos gasket 3, which insulates the die from the wear plate. 4 is one of a ring of rod-forming extrusion channels which pass from the die through the asbestos gasket, the wall of the casing and the wear plate; and 5 is a hollow, rotatable shaft through which cooling liquid may be supplied. A circular plate 6 is fixed near the end of the rotatable shaft, which passes therethrough; this plate is bored to receive either four or six equally spaced, fixed projecting members 7, on each of which is mounted, by a pivot, a carrying member 8 for a knife 9. The shaft 5 and the attached cutter assembly can be moved towards and away from the wear plate 1, and by this means the knives may be brought into operation against the plate; they are firmly pressed against the plate by leaf springs 10 acting from the fixed projecting members 7 through the knife carrying members 8. The whole assembly, from the plate 1, is enclosed in the volute casing 11; the front end of this casing is formed from a sheet of transparent plastic material through which the rotatable cutter shaft passes at the gland 12. The casing is provided with an outlet 13 for the cooling liquid and entrained granules of thermoplastic material, and with a plugged drainage outlet 14.

In operation, the thermoplastic material is extruded through the circular rod-forming orifices, and cooling liquid, which is usually water, is supplied through the centre of the shaft 5. This shaft, which has previously been set so that the knives are in their cutting position, is now set in rotation, in an anticlockwise direction, preferably at a speed not less than 100 revolutions per minute. The centrifugal pumping action of the rotating cutter and the pressure of liquid entering through the shaft cause the liquid containing the cut granules of thermoplastic material to be carried up the outlet 13 of the casing, from which it flows out to a suitable screen upon which the granules may be collected.

As stated in copending application Serial No. 452,635, the efficiency of the process may be increased if the cooling liquid is maintained at an elevated temperature which is however below the boiling point of the liquid and below the temperature at which the granules stick together. For this purpose, means for regulating the temperature and for circulating the cooling liquid, after it has been drained from the granules, may be provided as described in the said copending application.

The cut granules of thermoplastic material may conveniently be separated from the liquid, dried and removed to a container, by means of a vibrating screen. They are preferably removed from the liquid while they still have sufficient internal heat to assist rapid drying. However, the screen may if necessary be warmed to a suitable drying temperature, and may be inclined upwards to increase the drying time for the granules without the use of an inconveniently long screen. Currents of warmed air may, if desired, be passed across the screen. The liquid passing through the screen may be passed back to the cutter of the extrusion assembly either by the pumping action of the cutter itself or by an additional pump.

Many modifications of the apparatus particularly described may be made in accordance with the present invention. For example, instead of horizontal extrusion as shown, the thermoplastic material may be extruded vertically upwards or downwards, or at any other convenient angle; an advantage of extruding vertically upwards is that it eliminates the need to provide a leak-proof valve between the casing and the cutter drive. Other modifications that may be made include the use of a die, gasket and wear plate, having two or more rings of extrusion holes; or the use of a heat-insulating material other than asbestos, for example polytetrafluoroethylene, for the gasket. The knives of the cutter may be mounted on fins that are curved to increase the centrifugal pumping action of the cutter, if a stronger pumping action is required; it is better, however, to avoid great turbulence in the cooling liquid and it is therefore preferred that the upwardly flowing current be formed only in part by the centrifugal pumping action of the cutter, and the remainder by the force of water entering the cooling chamber. Methods other than that particularly described may also be used to separate and dry the cut granules. The extrusion orifices may if desired be square, rectangular, triangular or of polygonal shape, although for ease of operation and to produce particularly free-flowing granules it is preferred that they be of rounded shape.

The cooling liquid may, if desired, contain surface active agents to increase the efficiency of drying or to reduce the tendency of the granules, and of articles prepared therefrom, to accumulate electrostatic charges.

The process of this invention may be used for the production of granules of any thermoplastic polymer, for example, of polythene, vinyl polymers such as polyvinyl chloride and methacrylate polymers. It is particularly effective when used for the production of polythene granules, because as a result of the high thermal contraction of this polymer the freshly cut ends of the extruded rods or threads, being softer than the surfaces that have already contacted the cooling liquid and become somewhat contracted, are pushed out to a small extent by the molten material at the centre of the granule; thus, the tendency for these ends to assume the shape of a hemisphere is increased, and a particularly free-flowing and compact granular material is produced. The tendency for the granules to assume spherical shape is also increased if the polythene is extruded at temperatures well above its melting point, at which temperatures the melt is much less viscous. For this reason, and also to increase the output of the extruder, the temperature used for polythene is preferably at least 160° C.; it preferably does not exceed 250° C. because of the risk of decomposition.

The process may be used for the conversion of thermoplastic polymers in any form to the granular form. For example, the polymer may be received in the molten condition directly from the vessel in which it has been formed; it may be in the form of a fine powder; or it may be in the form of a plastic mass after compounding or homogenising in a Banbury or similar mixer, or of a cut or broken sheet. The material may if desired be homogenised or compounded in the extruder during the operation of the process of the invention; in this case the polymer may be supplied in the molten state direct from manufacture, or as a coarse mixture of polymer fragments, together with compounding agents such as colouring materials, antioxidants or fillers.

While the granules produced by the process of this invention have been described with reference to their use in extrusion, moulding and melt spinning processes, it will be appreciated that their uses extend to any process for which a thermoplastic material is needed in granular form. The granules are compact and uniform, and they can readily be produced in particle sizes suited to the size of the product and the nature of the operation for which they are to be used.

Our invention is illustrated but in no way limited by the following examples.

*Example I*

Polythene having an average molecular weight of 18,000 was extruded by means of a screw extruder having a 3.5 inch diameter, two start screw, through the die of a die and cutter assembly as shown in the accompanying drawings. The die, gasket and wear plate had 36 orifices, 0.1 inch in diameter, arranged in a single ring. The output of the extruder was 140 lbs./hr., the die temperature was 250° C., and the cooling tank contained circulating water maintained at a temperature of 55° C. A six-bladed cutter was used, rotating at a rate of 200 R. P. M. The liquid containing the cut granules was carried through the outlet of the casing to an upwardly inclined vibrating screen, through which most of the water drained away. The rest of the water was evaporated off by the residual internal heat of the granules; this drying was assisted by bouncing the granules up on the screen as well as propelling them forward along it. The granules were conveyed from the end of the screen, by hot air, to a collecting hopper. The dry granules were approximately spherical, 0.125 inch diameter, and they had smooth, matt surfaces and were free from rough edges; they formed an exceptionally free-flowing granular material.

*Example II*

A plasticized polyvinyl chloride composition (100 parts of polyvinyl chloride and 50 parts of dibutyl phthalate, by weight) was extruded by means of the extruder used in Example I through the die of a die and cutter assembly as shown in the accompanying drawings. The die, gasket and wear plate had 36 orifices, 0.1 inch in diameter, arranged in a single ring. The output of the extruder was 100 lbs./hour, the die temperature was 180° C., and the cooling tank contained circulating water maintained at a temperature of 50° C. A six-bladed cutter was used, rotating at a rate of 200 R. P. M. Smooth-surfaced, uniform pellets approximating to spheres were obtained.

We claim:

1. In a process for converting thermoplastic material into granules by extruding said material in molten condition as a thread or rod directly from an extrusion orifice into a body of cooling liquid and cutting the extruded material into granules while said extruded material is immersed in said cooling liquid and before it has cooled throughout to the solid state, the improvement which comprises extruding said material through a plurality of die orifices lying in the same plane around an axis parallel to the direction of extrusion, transversely cutting said extruded material with rotary cutter means rotating about said axis, continuously supplying the cooling liquid to the region of the center of rotation of said rotating cutter means whereby cooling liquid with granules entrained therein is driven outwardly by centrifugal force across the die face and away from said rotating cutting means, and withdrawing the liquid and entrained granules driven outwardly by said cutter means.

2. An extrusion apparatus for converting thermoplastic polymeric materials to granular form comprising a bath of cooling liquid, means for extruding material into said liquid, said means having a plurality of die orifices radially disposed about a central axis, rotary cutter means within said liquid for cutting the extruded material into granules, said cutter means mounted for rotation about said axis, means for continuously supplying cooling liquid to the region of said axis whereby said liquid is driven outwardly by centrifugal force away from said cutter means and entrains said granules, and means for withdrawing said cooling liquid with the granules entrained therein as said liquid is driven outwardly away from said cutter means by centrifugal force.

3. A process according to claim 1 in which said material is cut immediately against the extrusion orifice.

4. An apparatus according to claim 2 in which the cutter and extrusion face are surrounded by a volute casing which leads to an outlet for the liquid and the cut granules entrained therein.

5. An apparatus according to claim 2 in which the cutter is mounted on a hollow shaft and the cooling liquid is supplied through the open end of the shaft.

6. A process according to claim 1 in which the cooling liquid is maintained at a temperature above room temperature but below the boiling point of the liquid and below the temperature at which the granules stick together.

7. A process according to claim 1 in which the granules are afterwards separated from the liquid by means of a vibratory screen.

8. A process according to claim 1 in which the cut fragments are afterwards separated from the bulk of the cooling liquid while they still have sufficient internal heat to assist in evaporating the liquid adhering to their surfaces.

9. A process according to claim 1 in which the rate of cutting said extruded material is so adjusted in accordance with the diameter of said extruded material as to form fragments of substantially spherical shape.

10. A process according to claim 1 in which the thermoplastic polymeric material is polythene.

11. A process according to claim 10 in which the polythene is extruded at a temperature of from 160° to 250° C.

12. A process according to claim 10 in which the cooling liquid is water at a temperature of from 40° to 65° C.

13. A process according to claim 1 in which the thermoplastic polymeric material is polyvinyl chloride.

References Cited in the file of this patent

UNITED STATES PATENTS

| | | |
|---|---|---|
| 1,480,969 | Thomson | Jan. 15, 1924 |
| 2,021,837 | Davidson | Nov. 19, 1935 |
| 2,299,929 | Raynolds | Oct. 27, 1942 |
| 2,343,829 | Clayton | Mar. 7, 1944 |

UNITED STATES PATENT OFFICE
CERTIFICATE OF CORRECTION

Patent No. 2,850,764 — September 9, 1958

Peter John Evans et al.

It is hereby certified that error appears in the above numbered patent requiring correction and that the said Letters Patent should read as corrected below.

In the drawings, lines 2 and 3, title of invention, for "PROCESS AND APPARATUS FOR CONNECTING THERMOPLASTIC MATERIAL TO GRANULAR FORM" read -- PROCESS AND APPARATUS FOR CONVERTING THERMOPLASTIC MATERIAL TO GRANULAR FORM --.

Signed and sealed this 16th day of December 1958.

(SEAL)
Attest:
KARL H. AXLINE
Attesting Officer

ROBERT C. WATSON
Commissioner of Patents